(12) United States Patent
Stevens

(10) Patent No.: US 7,654,780 B1
(45) Date of Patent: Feb. 2, 2010

(54) LOAD LOCK ADJUSTMENT MECHANISM

(76) Inventor: Bruce Stevens, P.O. Box 633, Westminster, CO (US) 80036

( * ) Notice: Subject to any disclaimer, the term of this patent is extended or adjusted under 35 U.S.C. 154(b) by 390 days.

(21) Appl. No.: 11/647,004

(22) Filed: Dec. 28, 2006

Related U.S. Application Data

(60) Provisional application No. 60/776,255, filed on Feb. 24, 2006.

(51) Int. Cl.
*B60P 7/08* (2006.01)

(52) U.S. Cl. ............................. 410/151; 410/143

(58) Field of Classification Search .............. 410/143, 410/145, 151; 211/105.3, 105.4; 248/354.6, 248/354.4; 74/141.5, 167, 169; 254/12, 254/95, 108, 112
See application file for complete search history.

(56) References Cited

U.S. PATENT DOCUMENTS 5,947,666 A * 9/1999 Huang ......................... 410/151

* cited by examiner

*Primary Examiner*—Stephen Gordon
(74) *Attorney, Agent, or Firm*—Hensley Kim & Holzer, LLC

(57) ABSTRACT

A load lock adjustment mechanism for use with a load lock for trailers is provided. The load lock has a pad positionable against a trailer wall with a connecting rod extending from the pad and at least one tube sized and shaped for receiving the connecting rod. The load lock adjustment mechanism comprises an insert receivable within the tube with the insert having a threaded aperture extending therethrough and a pad holder having a first end and a second end with the first end of the pad holder having a bore for receiving the connecting rod extending from pad and the second end of the pad holder having a threaded hole formed therethrough to the bore. A threaded stud is receivable within the threaded aperture of the insert and receivable within the threaded hole of the pad holder. A tightening mechanism is secured between the first end and the second end of the stud. A lock collar is movable along the second end of the stud between the insert and the mechanism for securing the final distance between the pad and the tube.

20 Claims, 2 Drawing Sheets

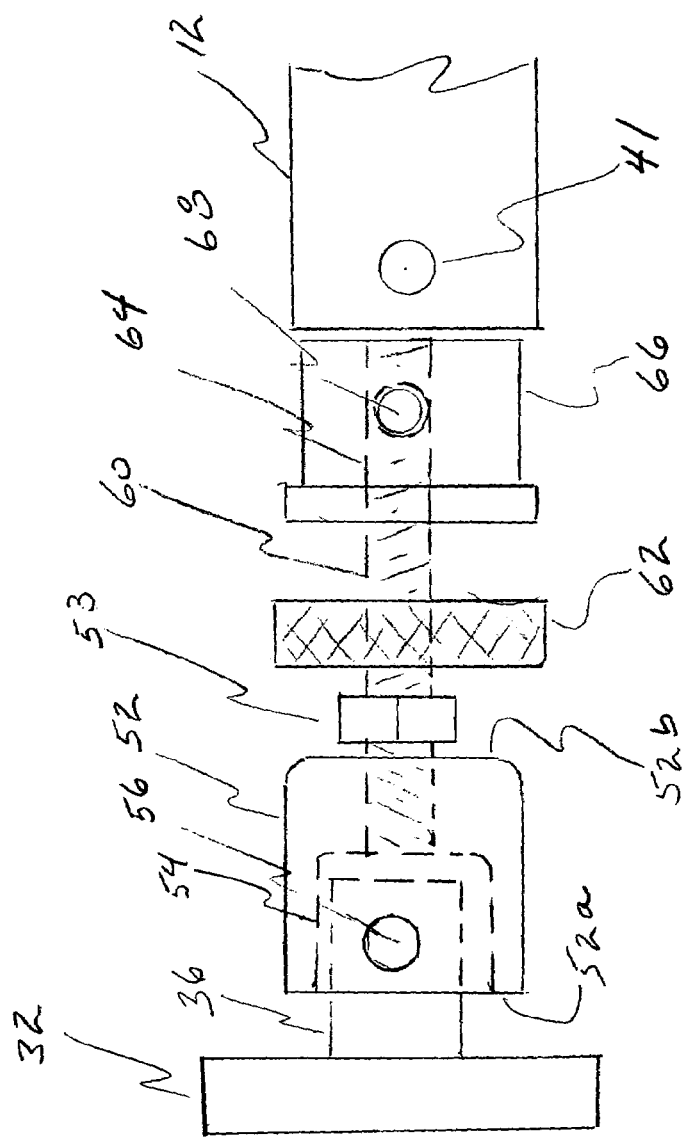
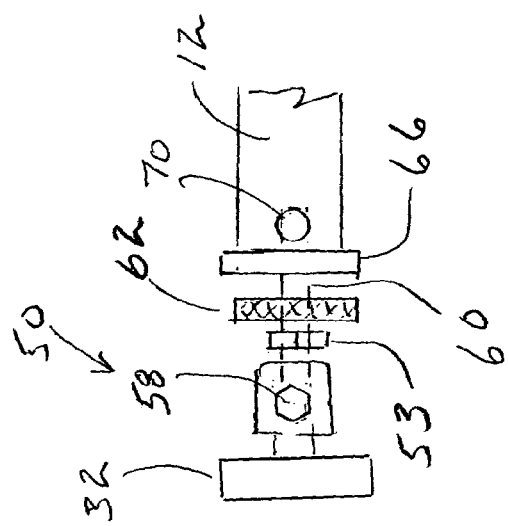
Fig. 3
Fig. 2

LOAD LOCK ADJUSTMENT MECHANISM

The present application is a continuation of provisional patent application Ser. No. 60/776,255, filed on Feb. 24, 2006, entitled "Load Lock Adjustment Mechanism".

BACKGROUND OF THE INVENTION

1. Field of the Invention

This invention relates generally to a load lock adjustment mechanism for securing freight inside a trailer and, more particularly, the invention relates to a load lock adjustment mechanism enabling the load lock to adjust to different trailer widths.

2. Description of the Prior Art

The prior art load lock 10, as illustrated in FIG. 1, has two lengths of round tubing 12, 14 with the tube 12 telescopingly received within the tube 14. A gear rack and pinion system 16 is used to adjust the position of one of the tubes with respect to the other tube. The gear rack and pinion system 16 includes a rack 18 secured at one end 18a to the tube 12 (or the tube 14) and extends in the direction of and over the other tube 14. A handle-locking device 20 is attached to the tube 14 (not the tube to which the rack is attached). The handle-locking device 20 has a U-shaped plate 22, which is disposed about the tube 14. The distance between the two free ends 22a, 22b (not shown) is wide enough to receive the rack 18. A bolt 24 secured between the two free ends 22a, 22b forms the center pin extending through a pinion gear 26. The pinion gear 26 can rotate about the center pin 24 extending through a hole 25. A handle 28 is secured to the pinion gear 26. The pinion gear 26 has a section without gears, preferably disposed in the opposite the direction to which the handle extends, so that when the handle is positioned perpendicular to the centerline 30 through the telescoping tubes 12, 14, the tubes can move with respect to each other. When the handle 28 is pivoted to a positioned parallel to the centerline 30, the pinion gear 26 engages the rack 18 and moves the telescoping tubes 12, 14 in opposite directions from each other. The handle 28 can be locked in place by conventional means.

Pads 32 and 34, formed of a slightly compressible material such as rubber, each have connecting rod 36 and 38, respectively, extending there from. The connecting rods 36 and 38 are attached to tubes 12 and 14, respectively, by bolts 40 and 42, respectively, extending through holes 41, 43 (see FIG. 3) in the tubes 12 and 14 and therefore have some degree of movement with respect to the tubes.

To install the conventional load lock 10 in the semi-trailer, the handle lock 28 is released and moved to a position parallel to and above the tube 12. Next, while holding the load lock with the pad 34 at the end of the larger diameter tube 14 against the semi-trailer wall and in a parallel position to the trailer floor, the smaller diameter tube 12 is extended until the pad 32 at the end of that tube touches the opposing wall. Then the handle 28 is moved 180 degrees from the position above the tube 12 in position above the tube 14 whereby the pinion gear 26 moves the rack 18 to further push the tubes 12, 14 away from each other to generate a clamping force that presses the pads 32, 34 into securing engagement with the side walls of a semi-trailer. The handle locks into place securing the load lock 10 between the trailer walls. The load lock 10 is supposed to secure the freight inside the semi-trailer in its loaded positioned until it is unloaded at the customer's facility.

The problem with the load lock 10 is that it is unable to be adjusted to the different widths encountered from trailer to trailer to a sufficient degree that the maximum clamping force is exerted against the trailer sidewalls. The reason for this inability to properly adjust the length of the load lock is caused by the coarse pitch of the rack and pinion 16. The pitch has to be coarse to make the rack strong enough to withstand the force exerted in order to hold the load lock in place while in transit. When the load lock is extended and the handle clamping maneuver results in the pinion hitting a tooth on the rack, the load lock length has to be slightly shortened to allow the pinion to engage between the teeth on the rack. This result in less clamping pressure than is needed to keep the load lock in place between the walls of the trailer. The reduced clamping pressure sometimes results in the load lock falling to the floor of the trailer. This can result in the freight shifting and causing damage to the freight. Sometimes, when the load lock falls to the floor, the driver is injured by falling freight while in the process of preparing the trailer to be unloaded at the customer's facility.

SUMMARY

The present invention is a load lock adjustment mechanism for use with a load lock for trailers. The load lock has a pad positionable against a trailer wall with a connecting rod extending from the pad and at least one tube sized and shaped for receiving the connecting rod. The load lock adjustment mechanism comprises an insert receivable within the tube with the insert having a threaded aperture extending therethrough and a pad holder having a first end and a second end with the first end of the pad holder having a bore for receiving the connecting rod extending from pad and the second end of the pad holder having a threaded hole formed therethrough to the bore. A threaded stud is receivable within the threaded aperture of the insert and receivable within the threaded hole of the pad holder. A tightening mechanism is secured between the first end and the second end of the stud. A lock collar is movable along the second end of the stud between the insert and the mechanism for securing the final distance between the pad and the tube.

The present invention further includes a method for securing a load in a trailer with a load lock with the load lock having a pad positionable against a trailer wall with a connecting rod extending from the pad and at least one tube sized and shaped for receiving the connecting rod. The method comprises providing an insert, inserting at least a portion of the insert into the tube, forming a threaded aperture through the insert, providing a pad holder having a first end and a second end, forming a bore in the first end of the pad holder, forming a threaded hole in the second end of the pad holder, inserting the connecting rod extending into the bore of the pad holder, providing a stud having a first end and a second end, securing the first end of the stud into the threaded aperture of the insert, securing the second end of the stud into the threaded hole of the pad holder, securing a mechanism between the first end and the second end of the stud, mounting a lock collar along the stud, turning the stud thereby moving the first end of the stud out of the insert and the second end of the stud out of the pad holder thereby increasing the pressure exerted by the pad on a sidewall of the trailer, and moving the lock collar between the insert and the mechanism for securing the final distance between the pad and the tube.

BRIEF DESCRIPTION OF THE DRAWINGS

FIG. 2 is a side view illustrating of a load lock adjustment mechanism, constructed in accordance with the present invention, with the load lock adjustment mechanism attached between a pad and a load lock; and FIG. 3 is another side view illustrating the load lock adjustment mechanism, constructed in accordance with the present invention.

DETAILED DESCRIPTION OF THE PREFERRED EMBODIMENTS

Figure 1:
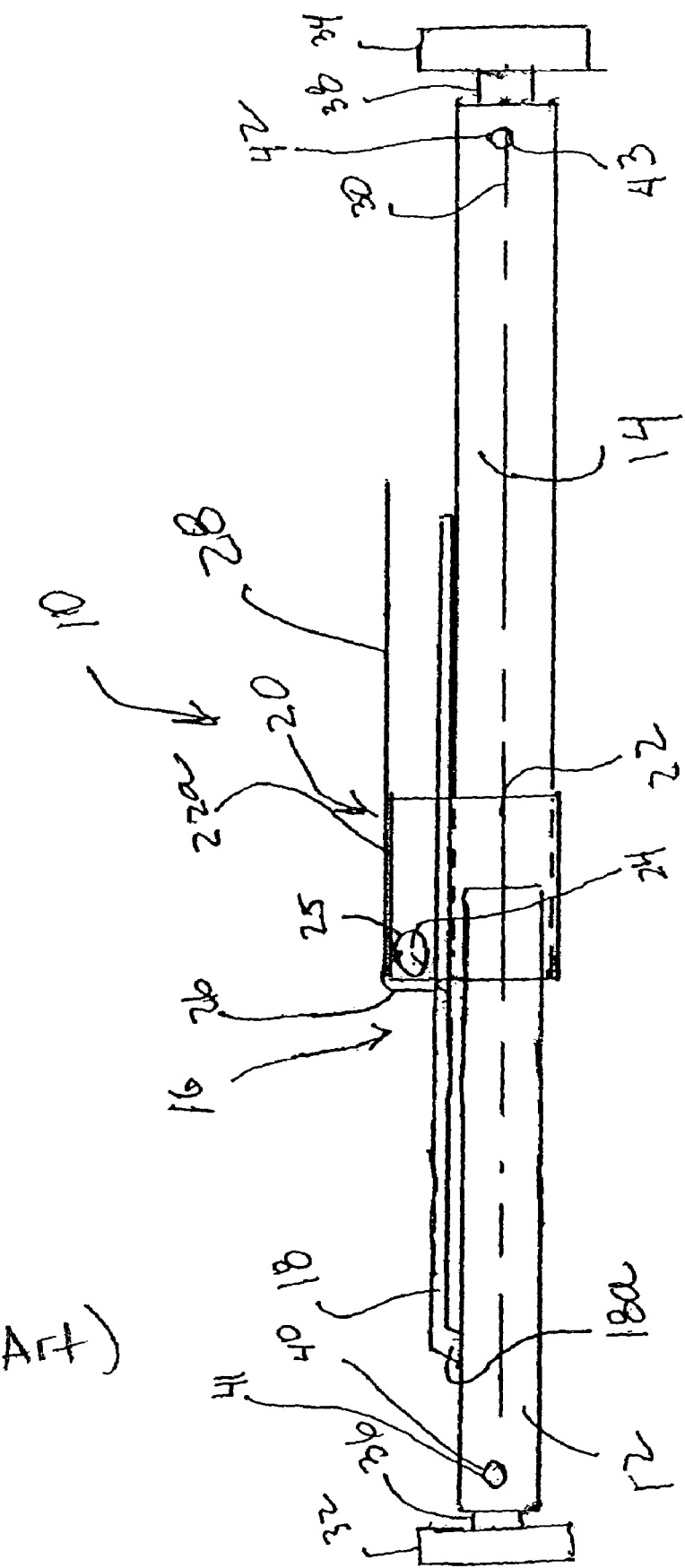
FIG. 1 is a side view illustrating a prior art load lock.

As illustrated in FIGS. 2 and 3, the present invention is a load lock adjustment mechanism, indicated generally at 50, for use with a load lock for trailers. The load lock adjustment mechanism 50 of the present invention inhibits the problem of adjustability of the load lock to accommodate the different widths encountered from trailer to trailer.

The load lock adjustment mechanism 50 has a cylindrically shaped pad holder 52 having a bore 54 opened at one end 52a adapted to receive the connecting rod 36 extending from pad 32 a predetermined distance into the bore 54. A hole 56 extends through the pad holder 52 and receives a bolt 58 (see FIG. 2) to attach the rod 36 to the pad holder. On the end 52b of the pad holder 52 opposite from end 52a, preferably, a left hand threaded tapped hole exists to accept stud 60 having a left hand thread threadable into 52 at end 52b. The opposite end of the stud 60 is a right hand thread which threads into insert 66.

It should be noted that while the tapped hole in the pad holder 52 and the hole in the insert 66 have been described as being left handed and right handed, respectively, it is within the scope of the present invention for the tapped hole in the pad holder 52 to be a right hand thread and the hole in the insert 66 to be a left handed thread.

At approximately the middle of the stud 60 is a hex configuration 53 allowing stud 60, with the use of a wrench, to extend the overall length of the clamped load lock adjustment mechanism 50. A lock collar 62 is used to secure the mechanism's final adjusted length to be secured by screwing 62 tightly against the shoulder located on insert 66 which is inserted into the tube 12 and secured to the tube 12 with a set screw 70 through hole 41 into tapped hole 68. While not illustrated herein, the load lock adjustment mechanism 50 can be secured to the open end of the tube 14.

The installation process remains the same as the prior art when using the load lock adjustment mechanism 50 as described hereinbefore. In upon activation of the load lock handle when the pinion hits a tooth on the rack; one only has to screw the pad receptacle 52 in or out of the insert 66. Then, the pad 32 is reengaged with the trailer wall and the handle lock is positioned so that the load lock is at the proper clamping position to obtain the maximum clamping force.

Sometimes, because of the flexibility of the trailer sidewalls, there is a need to add additional clamping pressure. In that case, after the load lock adjustment mechanism 50 has been adjusted and the load lock is in place, the nut 53 can be turned with a wrench to move the rod 60 out of the insert 66 and the pad holder 52 and thereby further increase the pressure exerted by the pad on the sidewall of the trailer to further the reliability of the load lock adjustment mechanism 50. After, the load lock is secured in place; the locking nut 62 is rotated until it is pressed against insert 66 so that the load lock adjustment mechanism 50 will remain in place under driving conditions.

The load lock adjustment mechanism 50 of the present invention will inhibit the vast majority of load lock failures when installed properly.

The following are proposed merely as an indication of what the inventor(s) may be interested in pursuing by way of patent protection, without prejudice to any future patent rights.

A load lock adjustment mechanism 50 secured at one end to a tube of a load lock and at the other end to a pad for adjusting the distance between the pads at the opposite ends of the load lock so that maximum clamping force can be applied to opposing walls of a semi-trailer.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A load lock adjustment mechanism for use with a load lock for trailers, the load lock having a pad positionable against a trailer wall with a connecting rod extending from the pad and at least one tube sized and shaped for receiving the connecting rod, the load lock adjustment mechanism comprising:
    an insert receivable within the tube, the insert having a threaded aperture extending therethrough;
    a pad holder having a first end and a second end, the first end of the pad holder having a bore for receiving the connecting rod extending from the pad, the second end of the pad holder having a threaded hole formed therethrough to the bore;
    a threaded stud having a first end and a second end, the first end of the stud receivable within the threaded aperture of the insert, the second end of the stud receivable within the threaded hole of the pad holder;
    a tightening mechanism secured between the first end and the second end of the stud for tightening the pad against the trailer wall; and
    a lock collar movable along the second end of the stud between the insert and the tightening mechanism for tightening against the insert thereby securing the load lock adjustment mechanism between the pad and the tube.

2. The load lock adjustment mechanism of claim 1 wherein the threaded aperture of the insert has right handed threads.

3. The load lock adjustment mechanism of claim 2 wherein the threaded hole in the pad holder is tapped having left handed threads.

4. The load lock adjustment mechanism of claim 3 wherein the second end of the stud has left handed threads threadable into the threaded hole of the pad holder and the first end of the stud has right handed threads threadable into the threaded aperture of the insert.

5. The load lock adjustment mechanism of claim 1 wherein the threaded aperture of the insert has left handed threads.

6. The load lock adjustment mechanism of claim 5 wherein the threaded hole in the pad holder is tapped having right handed threads.

7. The load lock adjustment mechanism of claim 6 wherein the second end of the stud has right handed threads threadable into the threaded hole of the pad holder and the first end of the stud has left handed threads threadable into the threaded aperture of the insert.

8. The load lock adjustment mechanism of claim 1 and further comprising:
an aperture extending through the insert and the tube; and
securing means for releasably securing the insert to the tube.

9. The load lock adjustment mechanism of claim 8 wherein the securing means is a bolt.

10. The load lock adjustment mechanism of claim 1 wherein the pad holder has a substantially cylindrical shape.

11. The load lock adjustment mechanism of claim 1 and further comprising:
an aperture extending through the pad holder and the connecting rod; and
a fastening mechanism for releasably securing the pad holder to the connecting rod.

12. The load lock adjustment mechanism of claim 11 wherein the fastening mechanism is a bolt.

13. A method for securing a load in a trailer with a load lock, the load lock having a pad positionable against a trailer wall with a connecting rod extending from the pad and at least one tube sized and shaped for receiving the connecting rod, the method comprising:
providing an insert;
inserting at least a portion of the insert into the tube;
forming a threaded aperture through the insert;
providing a pad holder having a first end and a second end;
forming a bore in the first end of the pad holder;
forming a threaded hole in the second end of the pad holder;
inserting the connecting rod into the bore of the pad holder;
providing a stud having a first end and a second end;
securing the first end of the stud into the threaded aperture of the insert;
securing the second end of the stud into the threaded hole of the pad holder;
securing a mechanism between the first end and the second end of the stud;
mounting a lock collar along the stud;
turning the stud thereby moving the first end of the stud out of the insert and the second end of the stud out of the pad holder thereby increasing the pressure exerted by the pad on a sidewall of the trailer; and
moving the lock collar between the insert and the mechanism against the insert.

14. The method of claim 13 and further comprising:
threading the first end of the stud with right handed threads;
threading the second end of the stud with left handed threads;
threading the threaded aperture with right handed threads; and
threading the threaded hole with left handed threads.

15. The method of claim 13 and further comprising:
forming an aperture through the insert and the tube; and
releasably securing the insert to the tube.

16. The method of claim 13 and further comprising:
forming an aperture through the pad holder and the connecting rod; and
securing the pad holder to the connecting rod.

17. A load lock adjustment mechanism for use with a load lock for trailers, the load lock having a pad positionable against a trailer wall with a connecting rod extending from the pad, the load lock having at least one tube sized and shaped for receiving the connecting rod, the load lock adjustment mechanism comprising:
an insert receivable within the tube, the insert having a threaded aperture extending therethrough, the threaded aperture having right handed threads;
an aperture extending through the insert and the tube;
first securing means for releasably securing the insert to the tube;
a pad holder having a first end and a second end, the first end of the pad holder having a bore for receiving the connecting rod extending from pad, the second end of the pad holder having a threaded hole formed therethrough to the bore, the threaded hole having left handed threads;
an aperture extending through the pad holder and the connecting rod;
second securing means for releasably securing the pad holder to the connecting rod;
a threaded stud having a first end and a second end, the first end of the stud receivable within the threaded aperture of the insert, the second end of the stud receivable within the threaded hole of the pad holder;
a tightening mechanism secured between the first end and the second end of the stud; and
a lock collar movable along the second end of the stud between the insert and the tightening mechanism for tightening against the insert thereby securing the load lock adjustment mechanism between the pad and the tube;
wherein the second end of the stud has left handed threads threadable into the threaded hole of the pad holder and the first end of the stud has right handed threads threadable into the aperture of the insert.

18. The load lock adjustment mechanism of claim 17 wherein the first securing means is a bolt.

19. The load lock adjustment mechanism of claim 17 wherein the pad holder has a substantially cylindrical shape.

20. The load lock adjustment mechanism of claim 17 wherein the second securing means is a bolt.

* * * * *